United States Patent
Todisco et al.

(10) Patent No.: US 12,307,861 B1
(45) Date of Patent: May 20, 2025

(54) AI-DRIVEN BET SEARCH

(71) Applicant: FanDuel Limited, Edinburgh (GB)

(72) Inventors: Michael Todisco, New York, NY (US); Catherine Everett, Jersey City, NJ (US)

(73) Assignee: FanDuel Limited, Edinburgh (GB)

( * ) Notice: Subject to any disclaimer, the term of this patent is extended or adjusted under 35 U.S.C. 154(b) by 0 days.

(21) Appl. No.: 18/753,765

(22) Filed: Jun. 25, 2024

(51) Int. Cl.
| | |
|---|---|
| *G07F 17/32* | (2006.01) |
| *G06F 40/58* | (2020.01) |
| *G06Q 50/34* | (2012.01) |

(52) U.S. Cl.
CPC .......... *G07F 17/3288* (2013.01); *G06F 40/58* (2020.01); *G06Q 50/34* (2013.01)

(58) Field of Classification Search
CPC ...... G07F 17/3288; G06F 40/58; G06Q 50/34
See application file for complete search history.

(56) References Cited

U.S. PATENT DOCUMENTS

| | | | | |
|---|---|---|---|---|
| 10,678,786 | B2 * | 6/2020 | Zeng | G06N 5/022 |
| 11,481,388 | B2 * | 10/2022 | Sianez | G06F 16/243 |
| 11,726,994 | B1 * | 8/2023 | Wang | G06F 16/243 |
| | | | | 707/769 |
| 2016/0086441 | A1 * | 3/2016 | Cohen | G07F 17/3288 |
| | | | | 463/25 |
| 2019/0205761 | A1 * | 7/2019 | Wu | G06F 16/353 |
| 2020/0005134 | A1 * | 1/2020 | Ramanath | G06N 3/045 |

* cited by examiner

*Primary Examiner* — Ronald Laneau
(74) *Attorney, Agent, or Firm* — Erise IP, P.A.

(57) ABSTRACT

Systems, methods, and computer-readable media for presenting one or more bets to a user based on a natural language query received from the user. In some embodiments, a natural language query from a user may be received. The natural language query may be translated into computer-readable data by a language processing engine. The language processing engine may use a large language model to translate the natural language query into computer-readable data. The computer-readable data may be in the form of an embedding. A bet engine may match the computer-readable data to a bet when the bet and the computer-readable data exceed a predetermined threshold with regard to similarity. The bet engine may generate a new bet corresponding to the computer-readable data. The system may then present the bet to the user.

20 Claims, 5 Drawing Sheets

AI-DRIVEN BET SEARCH

BACKGROUND

1. Field

Embodiments of the present disclosure relate to search engines. More specifically, embodiments of the present disclosure relate to bet search engines using artificial intelligence.

2. Related Art

Typically, users have a large range of options when placing sports bets. When placing a bet, users typically may choose from a wide variety of fields, such as sport, team, game, player, and the like. Further, users can then choose what to bet on, such as the outcome of the game, a particular player's statistics, the score of the game at a specific point, and many other events. As a result, providing a static list of all possible bets requires users to scroll through a long list of potential bets in order to find the particular bet they would like to place a wager on. Further, in some instances, systems may not have a means by which to search for particular fields a user is interested in, such as games that are trending on social media. As such, searching for bets is complex and not user-friendly, in line with consumers' desires. Therefore, systems and methods that provide intelligent bet searching are desired.

SUMMARY

In some aspects, the techniques described herein relate to a system for bet searching, the system including: a language processing engine operable to translate an input in a natural language to a computer-readable data point; an interface operable to receive the input from a user and transmit the input to the language processing engine; and a bet engine operable to determine a bet associated with the computer-readable data point.

In some aspects, the techniques described herein relate to a system, wherein the bet engine is operable to modify the bet based on an additional input from the user.

In some aspects, the techniques described herein relate to a system, wherein the bet engine is operable to utilize a live data set to generate the bet.

In some aspects, the techniques described herein relate to a system, wherein the language processing engine includes a machine learning model operable to generate an embedding corresponding to the input.

In some aspects, the techniques described herein relate to a system, wherein the machine learning model is a large language model.

In some aspects, the techniques described herein relate to a system, wherein the bet engine includes: a bet generator operable to generate a new bet matching the computer-readable data point.

In some aspects, the techniques described herein relate to a system, wherein the computer-readable data point is an embedding.

In some aspects, the techniques described herein relate to a method for presenting a search result to a consumer, the method including: receiving training data; training a language processing engine using the training data; receiving a first query from a user; translating the first query to a first query embedding; matching the first query embedding to a first bet embedding, the first bet embedding associated with a first bet; and presenting the first bet to the user.

In some aspects, the techniques described herein relate to a method, wherein the first query is in a natural language.

In some aspects, the techniques described herein relate to a method, wherein the first query received is written.

In some aspects, the techniques described herein relate to a method, wherein the first query is received as an audio input.

In some aspects, the techniques described herein relate to a method further including: receiving a second query from the user; translating the second query to a second query embedding; matching the second query embedding to a second bet embedding associated with a second bet, wherein the second bet is different from the first bet; and presenting the second bet to the user.

In some aspects, the techniques described herein relate to a method further including: generating the first bet to match the first query embedding.

In some aspects, the techniques described herein relate to a method, the method further including: refining the first bet based on a second query embedding corresponding to a second query.

In some aspects, the techniques described herein relate to one or more non-transitory computer-readable media including computer-executable instructions that, when executed by at least one processor, perform a method of presenting a search result to a user, the method including: receiving training data; training a language processing engine using the training data; receiving a first query from a user; translating the first query to a first query embedding; generating a first bet corresponding to the first query embedding; and presenting the first bet to the user.

In some aspects, the techniques described herein relate to one or more non-transitory computer-readable media, wherein the method further includes: translating the first query to the first query embedding using a large language model.

In some aspects, the techniques described herein relate to one or more non-transitory computer-readable media, wherein the method further includes: receiving a second query from the user; translating the second query to a second query embedding; and generating a natural language response to the second query.

In some aspects, the techniques described herein relate to one or more non-transitory computer-readable media, wherein the method further includes: matching the second query embedding to a second bet embedding corresponding to a second bet based on a similarity between the second bet embedding and the second query embedding exceeding a predetermined threshold.

In some aspects, the techniques described herein relate to one or more non-transitory computer-readable media, wherein the method further includes: presenting a set of bets to the user, wherein the first bet is included in the set of bets.

In some aspects, the techniques described herein relate to one or more non-transitory computer-readable media, wherein the first query from the user is a request to place the first bet on a sporting event.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
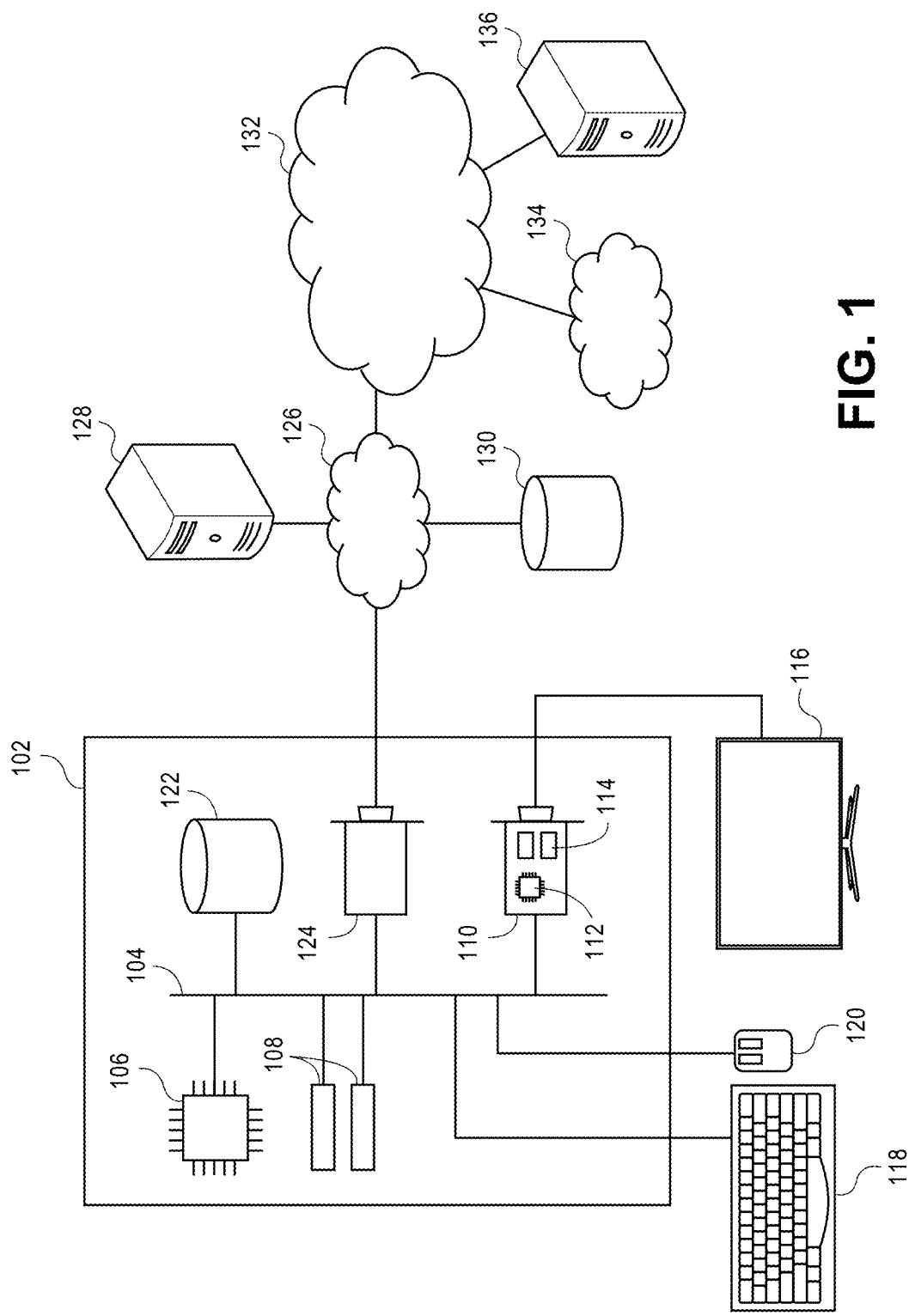
FIG. 1 depicts an exemplary hardware system in accordance with embodiments of the invention.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

The following disclosure is directed to systems, methods, and computer-readable media for presenting one or more bets to a user based on a natural language query received from the user. A bet may include any game and/or contest involving an amount of currency, whether the currency be virtual or physical, placed on the occurrence of a particular outcome. In some embodiments, a natural language query from a user may be received. The natural language query may be translated into computer-readable data by a language processing engine. The language processing engine may use a large language model to translate the natural language query into computer-readable data. The computer-readable data may be in the form of an embedding. The language processing engine may also interact with the user in a conversational manner by transmitting natural language to the user. A bet engine may match the computer-readable data to a bet when the bet and the computer-readable data exceed a predetermined threshold with regard to similarity. The bet engine may generate a new bet associated with the computer-readable data. The system may then present the bet to the user.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
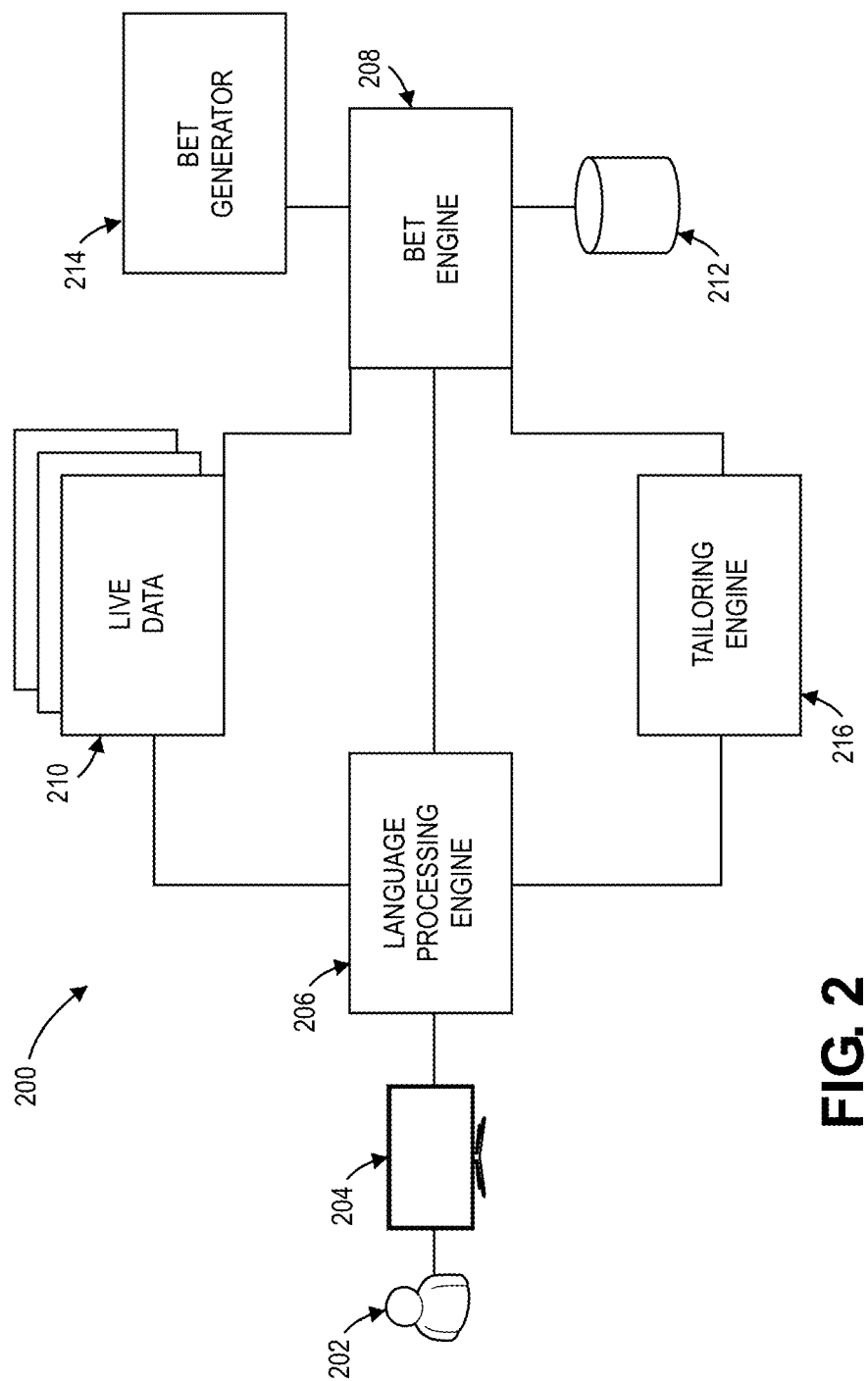
FIG. 2 depicts an exemplary system for bet searching in accordance with embodiments of the invention.

Continuing on, FIG. 2 depicts an exemplary system for bet searching in accordance with embodiments of the invention and generally referred to by reference numeral 200. Generally, search system 200 may take a user input and present the user with a corresponding bet. In some embodiments, user 202 may input a query through interface 204. User 202 may be any person or entity, including, but not limited to, a person searching for a game, a person searching for a live update, a person searching for a bet, and the like.

In some embodiments, user 202 may input a query in natural language. For example, user 202 may ask, "Give me a trending bet for $20." For another example, user 202 may ask, "What is the score of the Broncos game?" Broadly, interface 204 may be any device and/or mechanism now known or later developed for receiving input from a user. In some embodiments, interface 204 may be a text input device such that user 202 may type in order to query the system. For example, user 202 may input a query on a keyboard device. In some embodiments, interface 204 may be a speech input device, such as a microphone. For example, user 202 may speak into a microphone, "Generate me a random 3-leg parlay for the NFL games tomorrow."

Upon receiving input from user 202 via interface 204, language processing engine 206 may translate the input into a language understandable by bet engine 208. In particular, if the input from user 202 is in human-readable language, it may not be understood by various computer systems without further processing. Accordingly, language processing engine 206 may process the input/query from user 202 in order for various additional search system 200 components (such as bet engine 208) to function. For example, bet engine 208 may understand queries in the form of embeddings rather than in natural language. It is noted herein that language processing engine 206 may receive input in any language now known or later developed. In such embodiments, language processing engine 206 may translate human language into a computer-readable format regardless of the human language received.

In some embodiments, language processing engine 206 may generate a query embedding based on the query received from user 202. For example, a query may be input from a user stating, "I want a $20 bet involving Patrick Mahomes." Accordingly, language processing engine 206 may generate a bet embedding, such as a vector of numbers, corresponding to the semantic meaning behind input. As such, further components of search system 200 may utilize the embedding to present the user with the requested bet.

In some embodiments, language processing engine 206 may use machine learning in order to convert input from user 202 to computer-readable data. Machine learning models utilized by language processing engine 206 may be any suitable model now known or later developed, including, but not limited to, linear regression, logistic regression, support vector machines, naive bayes, k-nearest neighbors, boosting algorithms, decision trees, random forest, neural networks, classifiers, reinforcement learning, cluster analysis, k-means clustering, large language models, and similar machine learning models. For example, language processing engine 206 may include a large language model that utilizes neural networks in order to decipher the meaning behind human-understandable language. Language processing engine 206 is discussed further below with respect to language processing engine 406, depicted in 4.

Additionally, language processing engine 206 may behave as a conversational bot. For example, user 202 may input a query into interface 204, and language processing engine 206 may generate a response to the query and present the response back to user 202 in human-readable format through interface 204. In some embodiments, language processing engine 206 may utilize live data set 210 in interacting with user 202 through interface 204. For example, user 202 may prompt search system 200 by asking, "What is the score of the Bills' game?" Accordingly, language processing engine 206 may decipher the prompt, interface with live data 210 in order to determine the score of the Bills' game, and respond back to user 202 by saying, "The score is 7-0 with 4 minutes left in the first half." In such embodiments, context may be maintained between queries, such that the user can follow the above query by asking, "What is the over-under?" In such a scenario, language processing engine 206 can use the retained context to identify that the user is asking about the same game.

Upon translating a query from user 202 to computer-readable format, bet engine 208 may determine a bet to present back to user 202 through interface 204. In some embodiments, bet engine 208 may compare a query with bet data housed in bet data store 212 in order to determine a bet to present to user 202. In some embodiments, bet data store 212 may contain pre-existing bets and markets, such as bets in which pricing and risk are already determined. In other embodiments, bet data store 212 can determine bets (and more complex propositions such as parlays) and the associated odds in real time, responsive to the user's query. In some embodiments, bet engine 208 may determine that a particular bet is a match for a query based on whether the bet exceeds or falls below a given threshold. For example, bet engine 208 may determine that a bet matches a query if the bet and the query are at least 75% similar. As such, it may be possible for a plurality of bets to match a given query.

Any number of characteristics may be evaluated in order to determine the similarity between a query and a bet, including, but not limited to, words used, syntax, embeddings, length of query, terms, qualifiers, modifiers, structure, information sought, and user historical data. In some embodiments, the bet data housed in bet data store 212 may be in embeddings format, such that bet engine 208 may determine the similarity between a query embedding and the bet embeddings in order to determine the best matching bet to present a user with.

As discussed above, a plurality of bets may be identified as matching the query from user 202. As such, in some embodiments, bet engine 208 may present the most closely matching bet to the query to user 202. In some embodiments, bet engine 208 may present a plurality of bets to user 202 such that user 202 may select one or more bets to place.

In some embodiments, bet engine 208 may interface with bet generator 214 in order to generate a bet corresponding to a query inputted by user 202. Bet generator 214 may analyze the query inputted and generate a matching bet accordingly. For example, assume user 202 requests a bet that the Chiefs will be the first team to score after the half. Accordingly, bet generator 214 may generate a bet for the Chiefs to be the first team to score after the half and price the bet according to the amount of risk the bet poses to the entity providing the bet. This generated bet may then be served back to user 202.

In some embodiments, bet engine 208 may utilize live data 210 in order to determine a bet relating to data occurring in real-time as user 202 is inputting a query. For example, if a user inputs a query requesting a bet based on what is currently trending on social media, bet engine 208 may utilize live data 210 to determine what is trending on social media such that bet engine 208 may then interface with bet generator 214 to create a bet based on what is trending.

In some embodiments, tailoring engine 216 may be utilized to filter and/or refine the bets presented to user 202 by bet engine 208. For example, upon being presented with one or more bets, user 202 may desire to see a different bet(s). As such, user 202 may request the bets be shuffled. Accordingly, tailoring engine 216 may shuffle the bets such that new bets are presented to user 202. For another example, a user may desire to modify a bet presented to them in any number of ways, such as by deleting a leg of a parlay, changing the player being bet on, changing the team being bet on, and changing the bet amount. Accordingly, tailoring engine 216 may modify a bet based on a query by a user.

Figure 3:
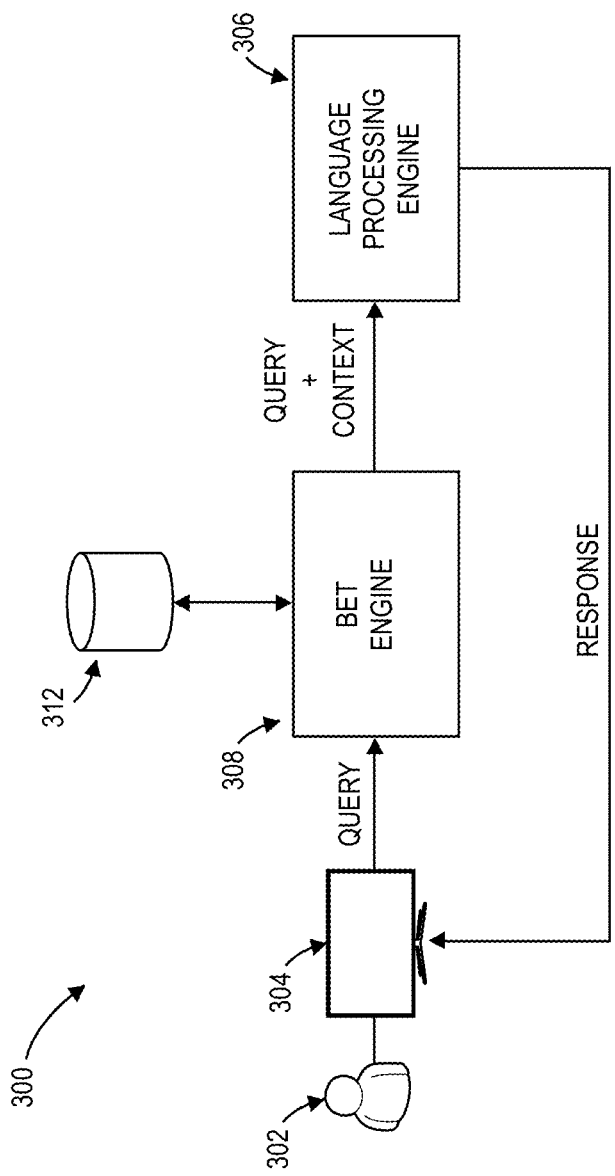
FIG. 3 depicts an exemplary system for bet searching in accordance with embodiments of the invention.

Continuing on, FIG. 3 depicts an exemplary system for bet searching in accordance with embodiments of the invention and generally referred to by reference numeral 300. Generally, as described above with regard to search system 200, search system 300 may take a user input and present the user with a corresponding bet. In some embodiments, user 302, generally corresponding to user 202 depicted in FIG. 2, may input a query through interface 304, generally corresponding to interface 304 depicted in FIG. 2. In some embodiments, user 302 may input a query in natural language, such as through a text input device.

Upon receiving a query from user 302, the query may be used by bet engine 308, generally corresponding to bet engine 208 depicted in FIG. 2, to determine an existing bet to provide to user 302. In some embodiments, bet engine 308 may generate a query embedding based on the query received from user 302, such as a vector of numbers, corresponding to the semantic meaning behind input. Bet engine 308 may interface with vector database 312, generally corresponding to bet data store 212 depicted in FIG. 2, to determine an existing bet that is substantially similar to the generated query embedding. As discussed above, a plurality of existing bets may be identified as matching the query from user 302. As such, in some embodiments, bet engine 308 may choose the closest existing bet embedding to be the match of the query embedding. Upon determining an existing bet matching the query, bet engine 308 may transmit the query, bet, and historical conversation context to language processing engine 306.

Language processing engine 306, generally corresponding to language processing engine 206 depicted in FIG. 2, may generate a response to the query inputted by user 302. As such, language processing engine 306 may present an existing bet corresponding to the matched embedding to user 302. In some embodiments processing engine 306 may behave as a conversational bot. For example, user 302 may input a query into interface 304, and language processing engine 306 may generate a response to the query, including the bet, and present the response back to user 302 in human-readable format through interface 304.

In some embodiments, language processing engine 306 may use machine learning to generate a response to user 302 in light of the query and previous conversation context. In some embodiments, language processing engine 306 may include a large language model that utilizes neural networks in order to decipher the meaning behind human-understandable language. In some embodiments, language processing engine 306 may be trained on historical data, such as (but not limited to) historical data relating to sports, sports betting, and related topics. Language processing engine 306 is discussed further below with respect to language processing engine 406, depicted in FIG. 4.

To illustrate, user 302 may input, "I want to bet on the Jets' game tomorrow" into interface 304. Accordingly, bet engine 308 may generate an embedding in the form of a vector of numbers corresponding to the semantic meaning behind, "I want to bet on the Jets' game tomorrow." Bet engine 308 may then interface with vector database 312 to match the generated embedding with a stored embedding representing an existing bet. For example, bet engine 308 may determine that an embedding representing a 3-leg parlay for the Sunday Jets' game is the best match to the query. Upon determining a matching embedding, bet engine 308 may serve the corresponding bet to language processing engine 306, where language processing engine 306 may present the bet back to user 302 in a conversational manner, such as by saying, "you may like this 3-leg parlay for the Sunday night Jets' game."

Figure 4:
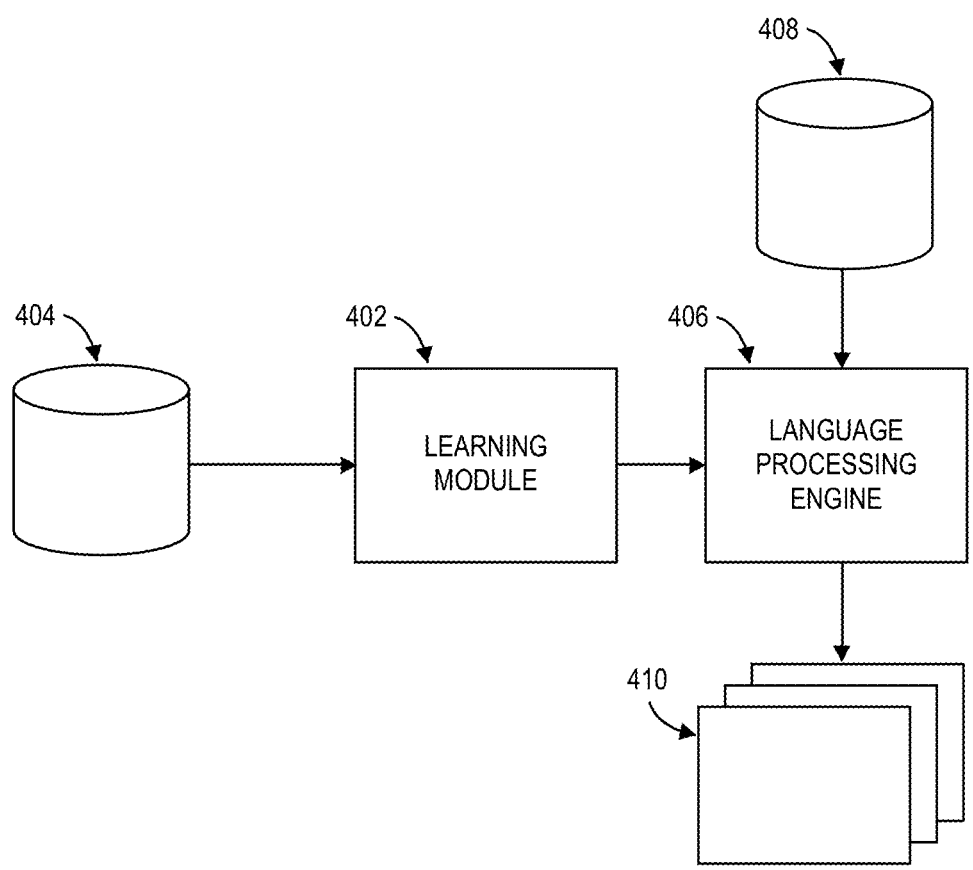
FIG. 4 depicts an exemplary system for training a language model in accordance with embodiments of the invention.

Continuing on, FIG. 4 depicts an exemplary machine learning system, in accordance with embodiments of the invention and generally referred to by reference numeral 300. In some embodiments, the exemplary machine learning system 400 may include language processing engine 406, generally corresponding to language processing engine 206 depicted in FIG. 2. Broadly, the exemplary machine learning system 400 may train and utilize language processing engine 406 to generate a computer-readable output (such as an embedding) corresponding to a given human-understandable input. As described above, the computer-readable output may correspond to an input such that it requests the same thing as was conveyed through human language.

Language processing engine 406 may be any type of machine-learning model now known or later developed, such as a supervised machine-learning system, an unsupervised machine-learning system, a rule-based system, a dictionary-based system, a bootstrapping system, a neural network system, a statistical system, a semantic role labeling system, a large language model, a generative machine learning system, a tuning of a large language model, a series of prompts to a large language model, a combination of the above-mentioned systems, and the like. In some embodiments, machine learning model 412 may be trained using learning module 402. Learning module 402 may receive training data from training data store 404. Training data store 404 may be any data store now known or later developed, including but not limited to an internal data store, an external data store, a cloud-based data store, a singular data store, a plurality of data stores, and the like.

Generally, the training data stored in training data store 404 and used by learning module 402 to train language processing engine 406 may be any suitable data set. In some embodiments, learning module 402 may utilize sports betting data, past sports betting data, sports broadcasts, a dictionary of betting language, and the like. For example, learning module 402 may utilize a library of frequently used bet terms and football terms in order to train language processing engine 406 to determine the particular bet being requested as it relates to football. More specifically, learning module 402 may utilize a library describing the word "passing yards" in order to train language processing engine 406 to understand what a user is requesting when the phrase "passing yards" is included in an input.

Further, in some embodiments, language processing engine 406 may parse and understand human language, whether it be written, spoken, or visual, in order to determine what a given query is requesting. As such, learning module 402 may use natural language processing to train language processing engine 406. Language processing engine 406 may be trained using any natural language processing technique now known or later developed, including, but not limited to, neural networks, name-entity recognition, relation extraction, text summarization, topic modeling, text classification, keyword extraction, lemmatization and stemming, and similar techniques. For example, learning module 402 may parse a request for an update on a particular game (using, for example, natural language processing or a large language model) to identify the information being requested by the user (e.g., the game score or the time left in the game).

Upon being trained, language processing engine 406 may receive query inputs 408, generally corresponding to input received from user 202 using interface 204 depicted in FIG. 2. Upon receiving query inputs 408, language processing engine 406 may output query embeddings 410 corresponding to the query inputs 408. For example, query embeddings 410 may correspond to query inputs 408 such that query embeddings 410 convey the meaning of query inputs 408. Query embeddings 410 may then be used to compare query inputs 408 to any number of bets to determine which bets match the requests of query inputs 408.

Figure 5:
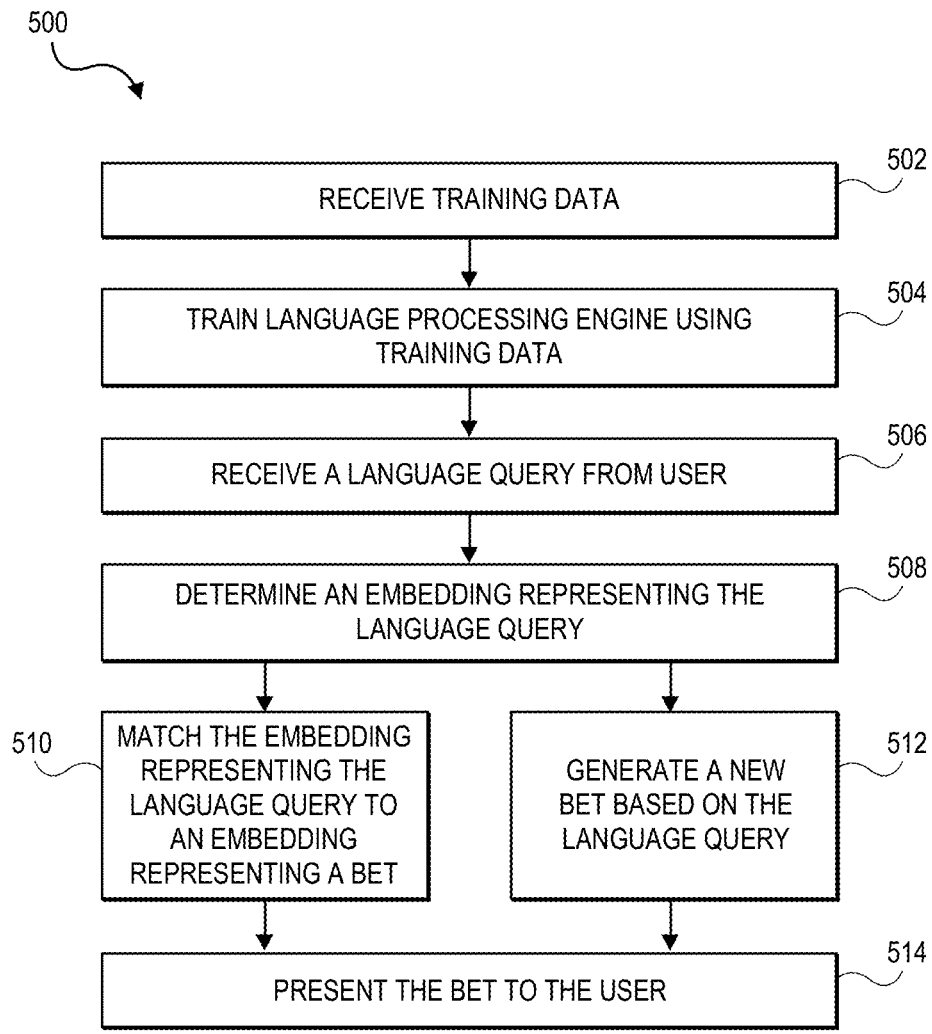
FIG. 5 depicts an exemplary flowchart for illustrating the operation of a method in accordance with embodiments of the invention.

Continuing on, FIG. 5 depicts an exemplary flowchart for illustrating the operation of a method, generally referred to by reference numeral 400, in accordance with embodiments of the invention. Broadly, method 500 may be used to present a user with a bet based on a query inputted by the user. In step 502, training data is received. In some embodiments, the training data may be any information relating to possible user inputs and bets, including, but not limited to, libraries relating to sports, libraries relating to betting, prior conversations regarding sports betting, broadcast transcripts, and the like.

In step 504, a language processing engine is trained on the training data. In some embodiments, the language processing engine is trained using a learning module, such as learning module 402 depicted in FIG. 4. The language processing engine may be trained using any type of learning, including, but not limited to, supervised and unsupervised learning. In some embodiments, as described above, the language processing engine may be trained to translate a query/input from human language to a computer-understandable language. For example, a language processing engine may be trained to translate the query, "Please delete the last leg of this parlay," to a numerical embedding, which may then instruct a bet engine to remove the last leg of the referenced parlay.

In step 506, a language query is received from the user. As described above with regard to FIG. 2, the query may be received by a user through an interface device in any format or combination of formats. In some embodiments, the query may be received as a text input. In other embodiments, the query may be received as an audio input. In still other embodiments, the query may be received as a visual input. The interface device may be any device now known or later developed for interfacing between a user and a system, including, but not limited to, a video camera, a keyboard, a touch screen, a microphone, a touchpad, a screen, and similar devices.

In step 508, the query is translated into an embedding. As described above, the query may be represented as an embedding such that it is a vector of real numbers. At a high level, the query may be translated into an embedding using various forms of machine learning, such as that described with regard to FIG. 4. In some embodiments, a large language model may be utilized to translate the query into an embedding.

In step 510, the embedding representing the language query is matched to a pre-existing embedding representing a bet. In some embodiments, the query embedding is compared to a data store of bet data, such as the bet data housed in bet data store 212 depicted in FIG. 2. Accordingly, the query embedding may be compared to bet embeddings to determine similarity, at which point the bet embeddings may be determined to be a match upon reaching a particular threshold of similarity. It is further contemplated that queries may be matched to bets by determining the similarity of other characteristics of the query and the bet, such as sentence structure, words used, description, tone, and other characteristics of language.

In step 512, in addition to step 510 or alternatively to step 510, a bet is generated based on the embedding representing the language query. In some embodiments, the bet generated may be unique from pre-existing bets in any number of ways. The bet may be generated based on real-time data, such as what is trending on social media or what is going on live in a sports game. In some embodiments, the generated bet may be analyzed and priced according to various factors, such as the amount of risk posed by the bet.

In step 514, the bet is presented to the user. In some embodiments, the bet may be presented to the user through an interface, such as that from which the user queried the system. Upon presenting the bet to the user, the user may then further query the system to obtain a new bet, modify the bet, refine the bet search, and other similar actions. Further, upon being presented with one or more bets, the user may then select whether or not to place a bet.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for bet searching, the system comprising:
   a language processing engine operable to translate an input in a natural language to a computer-readable data point;
   an interface operable to receive the input from a user and transmit the input to the language processing engine;
   a bet engine operable to determine a bet associated with the computer-readable data point, and
   one or more non-transitory computer-readable media comprising computer-executable instructions that, when executed by at least one processor, perform a method of presenting a first bet to the user, the method comprising:

receiving, via the interface, a first query from the user;
translating, via the language processing engine, the first query to a first computer-readable data point;
determining the first bet for the first computer-readable data point, wherein determining the first bet comprises:
matching the first computer-readable data point to an existing bet embedding, wherein the existing bet embedding is matched to the first computer-readable data point when a similarity score between the first computer-readable data point and the existing bet embedding exceeds a predetermined threshold, the existing bet embedding corresponding to the first bet; and
presenting, via the interface, the first bet to the user.

2. The system of claim 1, wherein the bet engine is operable to modify the bet based on an additional input from the user.

3. The system of claim 1, wherein the bet engine is operable to utilize a live data set to generate the bet.

4. The system of claim 1, wherein the language processing engine comprises a machine learning model operable to generate an embedding corresponding to the input.

5. The system of claim 4, wherein the machine learning model is a large language model.

6. The system of claim 1, wherein the bet engine comprises:
a bet generator operable to generate a new bet matching the computer-readable data point.

7. The system of claim 1, wherein the computer-readable data point is an embedding.

8. A method for presenting a bet to a user, the method comprising:
receiving, via a user interface, a first query from the user;
translating, via a language processing engine, the first query to a first query embedding;
determining a first bet for the first query embedding, wherein determining the first bet comprises:
matching the first query embedding to an existing bet embedding, wherein the existing bet embedding is matched to the first query embedding when a similarity score between the first query embedding and the existing bet embedding exceeds a predetermined threshold,
wherein the first bet corresponds to the existing bet embedding; and
presenting, via the user interface the first bet to the user.

9. The method of claim 8, wherein the first query is in a natural language.

10. The method of claim 9, wherein the first query received is written.

11. The method of claim 9, wherein the first query is received as an audio input.

12. The method of claim 8 further comprising:
receiving a second query from the user;
translating the second query to a second query embedding;
matching the second query embedding to a second bet embedding associated with a second bet, wherein the second bet is different from the first bet; and
presenting the second bet to the user.

13. The method of claim 8 further comprising:
receiving a second query from the user;
translating the second query to a second query embedding; and
determining a second bet for the second query embedding, wherein determining the second bet comprises at least one of:
matching the second query embedding to a second bet embedding corresponding to the second bet, wherein the second bet is different from the first bet; or
generating the second bet to match the second query embedding.

14. The method of claim 8, the method further comprising:
refining the first bet based on a second query embedding corresponding to a second query.

15. One or more non-transitory computer-readable media comprising computer-executable instructions that, when executed by at least one processor, perform a method of presenting a bet to a user, the method comprising:
receiving, via a user interface, a first query from the user;
translating, via a language processing engine, the first query to a first query embedding;
determining a first bet for the first query embedding, wherein determining the first bet comprises at least one of:
generating the first bet corresponding to the first query embedding; or
matching the first query embedding to an existing bet embedding, wherein the existing bet embedding is matched to the first query embedding when a similarity score between the first query embedding and the existing bet embedding exceeds a predetermined threshold, the existing bet embedding corresponding to the first bet; and
presenting, via the user interface, the first bet to the user.

16. The one or more non-transitory computer-readable media of claim 15, wherein the method further comprises:
translating the first query to the first query embedding using a large language model.

17. The one or more non-transitory computer-readable media of claim 15, wherein the method further comprises:
receiving a second query from the user;
translating the second query to a second query embedding; and
generating a natural language response to the second query.

18. The one or more non-transitory computer-readable media of claim 15, wherein the method further comprises:
presenting a set of bets to the user, wherein the first bet is included in the set of bets.

19. The one or more non-transitory computer-readable media of claim 15, wherein the first query from the user is a request to place the first bet on a sporting event.

20. The one or more non-transitory computer-readable media of claim 15, wherein the method further comprises:
receiving a second query from the user;
translating the second query to a second query embedding; and
matching the second query embedding to the existing bet embedding corresponding to the first bet, wherein both the first query embedding and the second query embedding are matched to the existing bet embedding.

* * * * *